Patented May 13, 1941

UNITED STATES PATENT OFFICE 2,241,792

PROCESS OF PRODUCING DIOLEFINS

Walter Reppe, Adolf Steinhofer, and Otto Hecht, Ludwigshafen-on-the-Rhine, Germany, assignors, by mesne assignments, to General Aniline & Film Corporation, New York, N. Y., a corporation of Delaware No Drawing. Application October 25, 1938, Serial No. 236,910. In Germany November 4, 1937

2 Claims. (Cl. 260—680)

The present invention relates to a process of producing diolefins.

We have found that diolefins are obtained in good yields by leading tetrahydrofuranes in the gas phase over catalysts capable of splitting off water. As suitable tetrahydrofuranes there may be mentioned tetrahydrofurane itself as well as its alkyl, aryl or aralkyl substitution products.

Suitable catalysts are in particular solid dehydration catalysts, e. g. phosphates which have a weak acid reaction under the reaction conditions, such as primary sodium phosphate, alkali metal acid pyrophosphate, primary and secondary calcium phosphate or the phosphates of other alkaline earth metals, nickel or cobalt phosphates, silver or copper phosphate, mercury or lead phosphate, and phosphoric acid itself precipitated on carrier substances, e. g. pumice stone. Other acid salts may be used, for example salts of the heteropolyacids of tungsten and molybdenum, boric acid precipitated on carrier substances, acid oxides, as for example tungsten oxides, molybdenum oxides or silica gel. Mixtures of the said catalysts have also been found suitable. Non acid dehydration catalysts may also be used, for example, aluminum or chromium oxide.

The splitting off of water from the tetrahydrofuranes with the formation of diolefins frequently commences even at 250° C. Generally speaking, however, temperatures of from 300° to 450° C. should be used in order to get a good throughput.

The tetrahydrofuranes may also be led over the catalysts in admixture with inert gases or vapors, as for example carbon dioxide, nitrogen or steam or under reduced pressure.

The following examples will further illustrate how this invention is carried out in practice but the invention is not restricted to these examples.

Example 1

1000 cubic centimetres of grained bleaching earth are impregnated with 32 grams of tungstic acid and the whole heated in an atmosphere of hydrogen at from 420° to 490° C. whereby the tungstic acid is reduced to the blue oxide. Over 500 cubic centimetres of the catalyst thus obtained there are led at from 330° to 390° C. 44 grams of tetrahydrofurane per hour. In addition to 15 grams per hour of unchanged tetrahydrofurane and small amounts of olefins, butadiene is thus obtained in a good yield.

The vapor of the tetrahydrofurane may suitably be diluted with suitable guide gases, such as nitrogen, whereby the life of the catalyst is extended. It is also possible to work at increased or reduced pressure.

Example 2

Tetrahydrofurane is led in the manner described in Example 1 over granulated pumice stone on which mercurous phosphate has been precipitated, the temperature being from 280° to 290° C. A 99.5 per cent butadiene is obtained in a yield of 71 per cent.

Example 3

22 grams of tetrahydrofurane are led per hour at 360° C. over 300 cubic centimetres of granulated calcium phosphate which has been prepared by heating primary calcium orthophosphate at 400° C. A gas containing 88 per cent of butadiene is condensed in a receiver cooled with carbon dioxide snow and toluene.

Example 4

100 parts by weight of primary sodium orthophosphate are fused together with 12 parts of orthophosphoric acid and 100 parts of graphite grains (from 5 to 7 millimetres diameter). 3.14 parts of nickel acetate are added to the fused mixture while hot, and the whole is allowed to cool. The melt is then broken into pieces and dried at 200° C. until steam is no longer evolved.

2 litres of this catalyst are brought into a tube which may be electrically heated and 110 grams of a vaporous mixture of 94 per cent by volume of tetrahydrofurane and 6 per cent by volume of water are led per hour at from 260 to 310° C. over the catalyst. A 97 to 99 per cent butadiene is thus obtained in a yield of 65 per cent of the tetrahydrofurane led over the catalyst. The residual 35 per cent constitute unchanged tetrahydrofurane which may again be led over the catalyst.

Instead of nickel acetate, cobalt acetate, copper phosphate, silver phosphate or lead acetate may be used in the preparation of the catalyst.

What we claim is:

1. A process for the production of butadiene which comprises leading tetrahydrofurane in the gas phase at temperatures between about 250° and 450° C. over a phosphate catalyst having an acid reaction.

2. A process for the production of butadiene which comprises leading tetrahydrofurane in the gas phase in the presence of steam at temperatures between about 250° and 450° C. over a phosphate catalyst having an acid reaction.

WALTER REPPE.
ADOLF STEINHOFER.
OTTO HECHT.